US007895226B2

(12) United States Patent
Koch et al.

(10) Patent No.: US 7,895,226 B2
(45) Date of Patent: Feb. 22, 2011

(54) SYSTEM AND METHOD FOR TRANSLATING AND EXECUTING UPDATE REQUESTS

(75) Inventors: Wolfgang M Koch, Oestringen (DE); Rainer Brendle, Mountain View, CA (US); Jan Karstens, Mannheim (DE); Gunther Albert Liebich, Walldorf (DE); Andreas Wildhagen, Angelbachtal (DE)

(73) Assignee: SAP AG, Walldorf (DE)

( * ) Notice: Subject to any disclaimer, the term of this patent is extended or adjusted under 35 U.S.C. 154(b) by 381 days.

(21) Appl. No.: 11/987,466

(22) Filed: Nov. 30, 2007

(65) Prior Publication Data

US 2009/0144252 A1 Jun. 4, 2009

(51) Int. Cl.
*G06F 17/30* (2006.01)

(52) U.S. Cl. ............................... 707/760; 707/999.004; 707/999.104; 707/763; 707/E17.006; 718/104

(58) Field of Classification Search ..................... 705/9; 707/999.104, 999.107, 999.201, E17.006, 707/E17.032; 715/751, 229, 762, 963, 971
See application file for complete search history.

(56) References Cited

U.S. PATENT DOCUMENTS

| 5,124,909 A | * | 6/1992 | Blakely et al. ............. 709/203 |
| 5,392,390 A | * | 2/1995 | Crozier ....................... 715/751 |
| 5,560,005 A | * | 9/1996 | Hoover et al. ................ 707/10 |
| 5,634,053 A | | 5/1997 | Noble et al. |
| 5,713,020 A | | 1/1998 | Rieter et al. |
| 5,826,261 A | | 10/1998 | Spencer |
| 6,134,549 A | * | 10/2000 | Regnier et al. ..................... 1/1 |
| 6,233,586 B1 | | 5/2001 | Chang et al. |
| 6,272,488 B1 | | 8/2001 | Chang et al. |
| 6,457,009 B1 | | 9/2002 | Bollay |
| 6,996,589 B1 | | 2/2006 | Jayaram et al. |
| 7,240,045 B1 | | 7/2007 | Bushee |
| 2002/0133504 A1 | * | 9/2002 | Vlahos et al. ............ 707/104.1 |
| 2002/0184340 A1 | | 12/2002 | Srivastava et al. |
| 2003/0195862 A1 | * | 10/2003 | Harrell, Jr. ..................... 707/1 |
| 2004/0015506 A1 | | 1/2004 | Anonsen et al. |
| 2006/0095332 A1 | | 5/2006 | Riemann et al. |
| 2008/0189655 A1 | | 8/2008 | Kol et al. |
| 2010/0162141 A1 | | 6/2010 | Koch et al. |

OTHER PUBLICATIONS

Oracle, "Oracle 9i Database Performance Tuning Guide and Reference Release 2 (9.2)," Oct. 2002.
European Search Report, completed Dec. 17, 2009, from European Patent Application No. EP 09 01 2584.

* cited by examiner

*Primary Examiner*—Cheyne D Ly
(74) *Attorney, Agent, or Firm*—Kenyon & Kenyon LLP

(57) ABSTRACT

Methods and systems for converting standardized, structured update requests into native business object commands are provided. The structured update requests may be defined in a business object-specific structured query language (BQL). A BQL engine may translate the structured update request into a command formatted for use by the appropriate business object or a programming interface in communication with the business object.

22 Claims, 6 Drawing Sheets

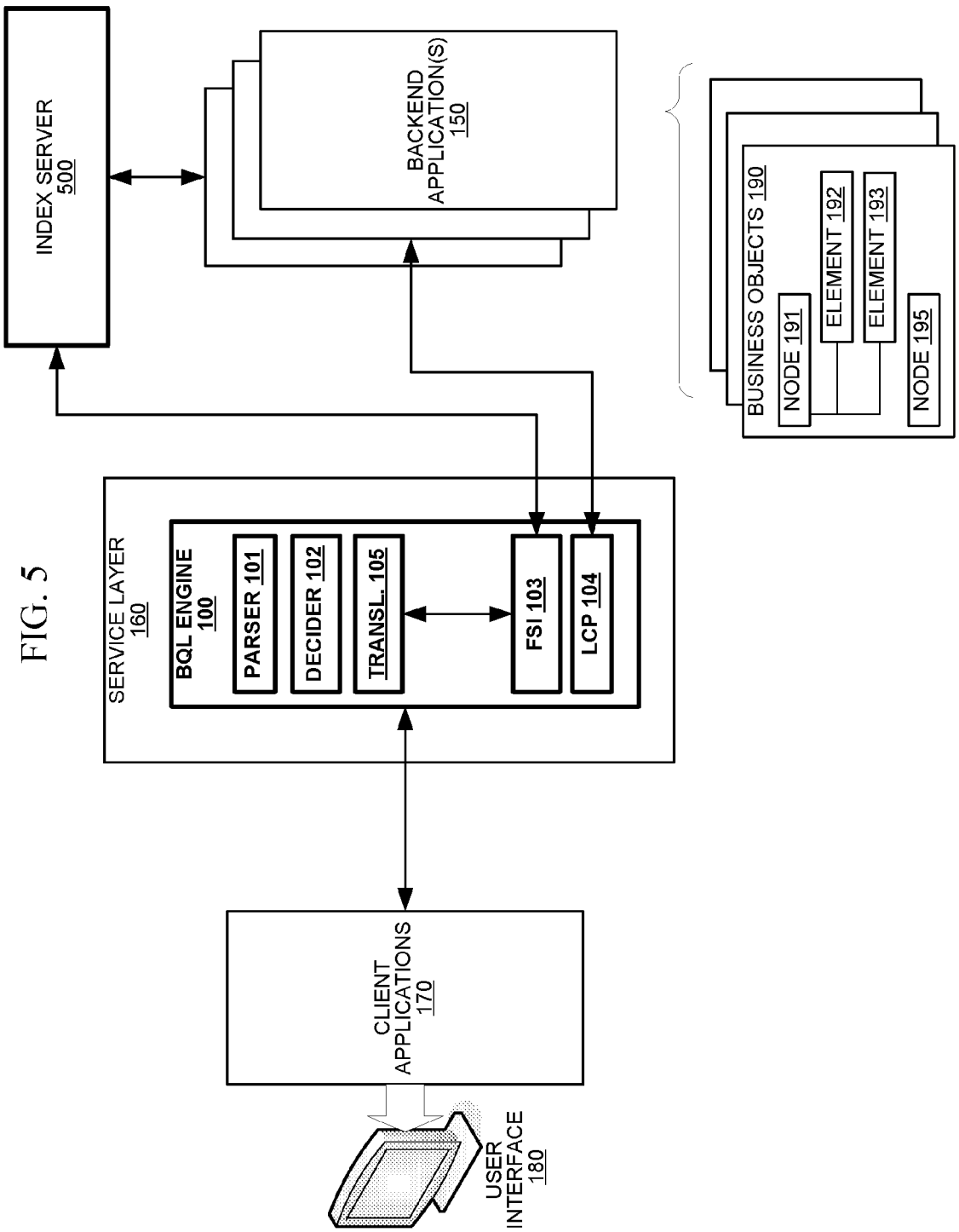

SYSTEM AND METHOD FOR TRANSLATING AND EXECUTING UPDATE REQUESTS

BACKGROUND

Modern firms use complex business systems to define and perform the business processes used by the firms. The business system typically includes a variety of backend applications to perform related tasks and define related processes, such as inventory management, employee management, customer relations, etc. Each application makes use of a variety of business objects, which contain data and business logic to manipulate the data.

Typically, the user interface used to access these backend applications does not include any business or functional logic itself. Rather, the backend applications provide functions and services to the user interface, which provides communication between a user and the applications using the services provided by the applications. Thus, the functionality presented by the user interface is limited by the services exposed by the backend applications.

In many cases the user interface may be created by a different entity than the backend applications. For example, a customer might purchase a generic business system from a supplier, then create (or have created by a second supplier) a customized user interface. Creating the client (frontend) interface may be problematic for a variety of reasons. Often, it requires creating large amounts of functionality to interface with various data sources in the business system. Since each business object and/or backend application might have a different interface, this can require large amounts of time and work. Similarly, data received from various data sources in the business system may have different formatting and structure. To present a consistent user interface, client applications may have to harmonize data received from these disparate sources.

Since user interfaces may result in additions, deletions, and/or modifications to stored data, allowing arbitrary access to user interfaces may be problematic for the security and data integrity of the backend. Various access mechanisms are used to maintain security and data integrity. For example, client proxies may provide services that let user interfaces modify data stored in the backend.

However, conventional approaches can have several problems. Typically, data modification calls made by the user interface must be coordinated by the user interface. Since one data change can require multiple updates to maintain data integrity, multiple data calls may be needed. Thus, large amounts of code are typically written for each modification, and a high amount of network traffic may be generated by data updates.

Client proxies also typically have a fixed level of granularity for data modifications. That is, a client has no way to define the granularity of modifications to data stored by the backend. This can also result in increased network traffic between the client and the backend.

Thus there is a need in the art for a uniform, flexible way to modify the data stored in and services provided by business objects.

BRIEF DESCRIPTION OF THE DRAWINGS

FIG. 5 shows an exemplary BQL engine including a fast search infrastructure 103 and a local client proxy according to an embodiment of the present invention.

DETAILED DESCRIPTION

Methods and systems for building client-defined queries from structured business object data are provided. The queries may be defined in a business object-specific structured query language (BQL). The BQL engine can translate the structured query into a query suited for use by the appropriate business object. In an embodiment, the BQL engine and the related query language provide the primary interface to backend applications and business objects. Embodiments may include a search infrastructure to create indexed views of business objects and a local client proxy to handle requests that are not handled by indexed views, by operating on a business object directly.

Since the structured query is written in a pre-defined structured language, relatively little code or processing is required to construct the query in a client application. Similarly, a developer or user of the client application can use the structured language to specify the amount and format of data desired, which can decrease the amount of data sent by a backend application in response to the query. Thus, embodiments of the present invention may allow for faster and more efficient client applications.

Figure 1:
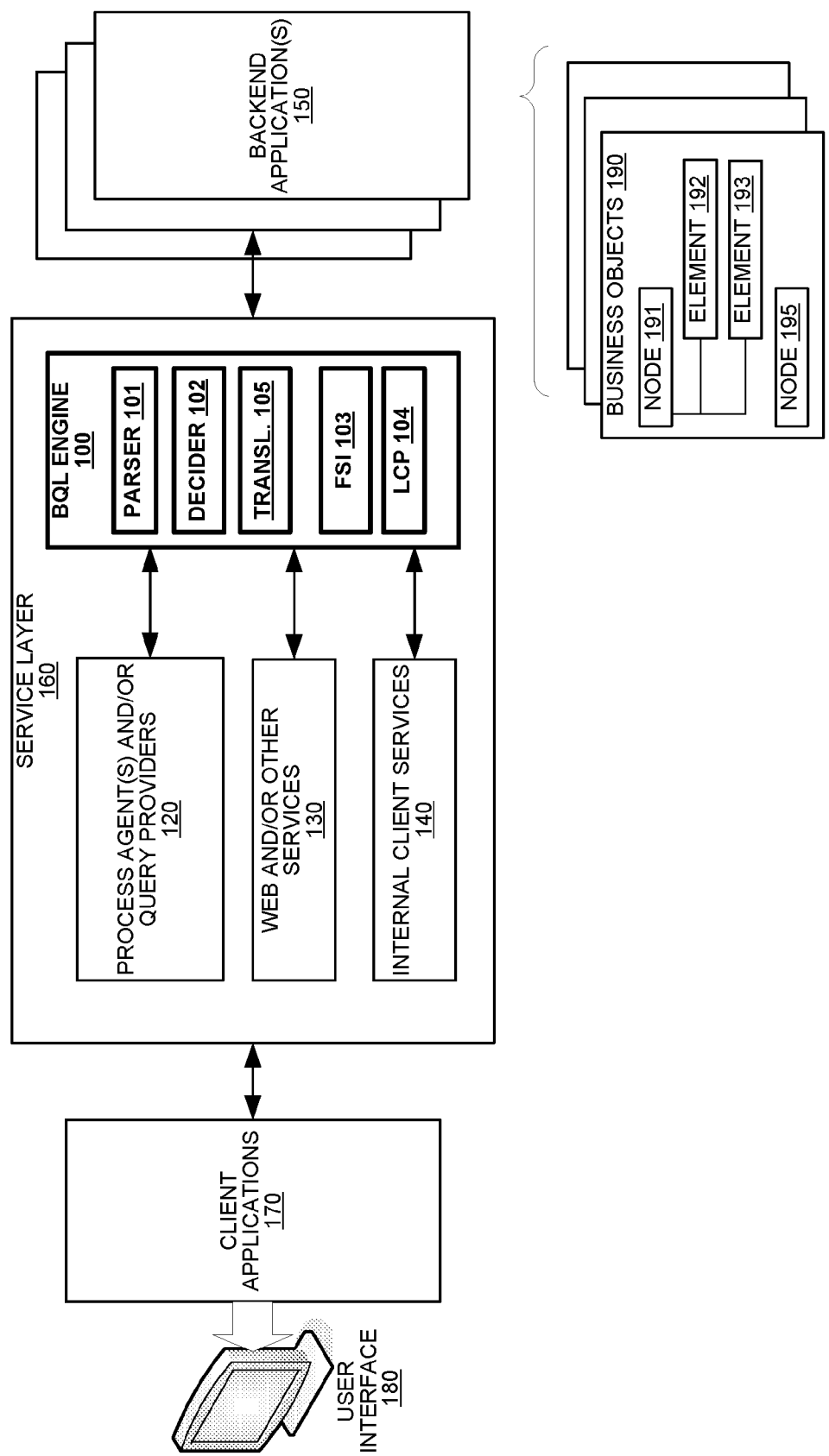
FIG. 1 shows a business system having a BQL engine according to an embodiment of the present invention.

FIG. 1 shows a business system having a BQL engine. Client applications 170 may display a user interface 180 to allow a user to navigate and operate the business system. Typically, the client applications 170 interact with a service layer 160, which provides various interfaces to the business system. The service layer 160 may have internal elements, such as query providers 120, web services 130, and internal client services 140. In a traditional business system, the service layer coordinates requests between the client applications 170 and/or other applications 120, 130, 140. In an embodiment of the present system, a BQL engine 100 provides an interface between backend applications 150 and the various applications, including client applications 170.

The operation of the BQL engine 100 during a read query is further described in U.S. application Ser. No. 11/760,483, filed Jun. 8, 2007, the disclosure of which is incorporated by reference in its entirety. When a client application 170 sends a request to add, delete, or update (i.e., modify) data used by the backend applications 150, the update request may be formulated using a structured query language. The BQL engine may receive the structured update request, and translate it into one or more native commands that can be understood by the target applications and/or business objects contained in the applications. The backend applications 150 may contain typical business objects 190, with each business object having nodes 191, 195, each node storing various elements 192, 193. For clarity, the business object 190 is shown using representative nodes 191, 195 and elements 192, 193. Typically, and as would be understood by one of skill in the art, a business object may include a multi-level hierarchy of nodes, where each node may have child nodes and/or parent nodes, and a node at any level may have one or more elements associated with it. As described in further detail below, a structured update request sent by a client application may reference a specific business object, node, and/or property within one or more of the backend applications.

The BQL engine 100 may include sub-components to realize various functions performed by the engine. For example, a parser 101 may receive, analyze, and/or decompose structured update requests received from various requestors 170, 120, 130, 140. An execution decider 102 may determine appropriate business objects to receive translated update commands, perform tests to determine efficient execution strategies, and/or otherwise route native commands to backend applications. It also may formulate an estimated execution process or time, such as when an "explain plan" request is received. A native query translation engine 105 may translate a received update query into a command format native to a target business object. For example, if the parser 101 decomposes a structured update request, the components of the update query may be passed to the native translation engine 105, which can use the components to construct a native command for processing by a business object, node, or backend application. Other components may be included in or in communication with the BQL engine, such as a fast search infrastructure (FSI) 103 and/or a local client proxy (LCP) 104.

Figure 2:
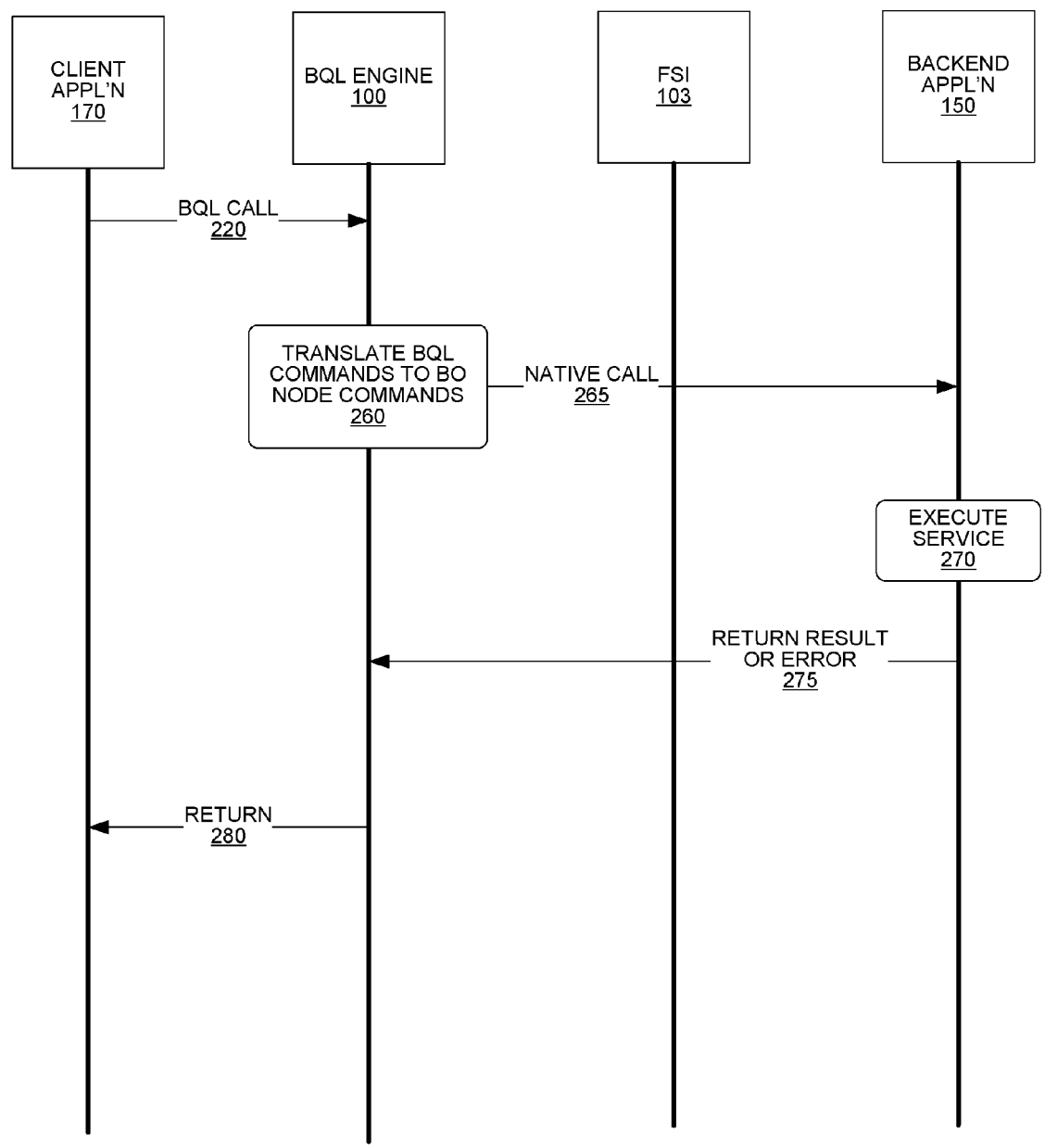
FIG. 2 shows an exemplary request and service execution in an embodiment of the present invention.

FIG. 2 shows an exemplary request and service execution in an embodiment of the present invention. A client application 170 may send a service request 220 to a BQL engine 100 in a business system. The request may be initially processed by or transmitted via a service layer (not shown). The initially-generated request may be a structured update query, such as a BQL add, modify, and/or delete request. For example, the service layer may present a user interface to the client application 170, with interface components that are tied to or can generate a BQL update request. In such an embodiment, an operator of the client application may select an interface component, and the client application and/or the service layer may generate a structured query based on a user selection. The structured update query may be defined during design or configuration of the business system and associated with a user interface element which is presented to the client application. Typically, the client application will include a BQL update request defined when the interface is developed, that is associated with a user interface element. When the interface element is operated by a user, the BQL update call 220 is sent to the BQL engine.

A structured query such as a BQL call 220 may then be sent to the BQL engine from the client application or the service layer. The BQL engine may translate 260 the BQL update call 220 into native commands that can be processed by a node in the backend application 150, and send the native commands 265 to the backend application. The backend application, business object, or node may receive the native commands and execute an appropriate service 270. If an error is generated by the update commands, an error 275 may be returned by the backend. For example, the BQL update command 220 may have a syntax error that results in non-executable native commands, or it may reference an improper or nonexistent object. Other errors may be identified by the backend. If no error condition is encountered, the backend application may return a result, such as a notification of a newly-created object, a verification that an update has been processed correctly, or another notice.

The BQL engine also may identify errors in a BQL update call 220 sent by the client application. In this case, the BQL engine may return an error message or other notification to the client application 170 before or instead of translating the BQL update call into native backend commands.

The BQL engine may return 280 various results and/or error messages to the client application. This return message may include error messages generated by the BQL engine, error messages generated by the backend, and verifications created by the backend in response to an update. Other messages may be included.

Figure 3:
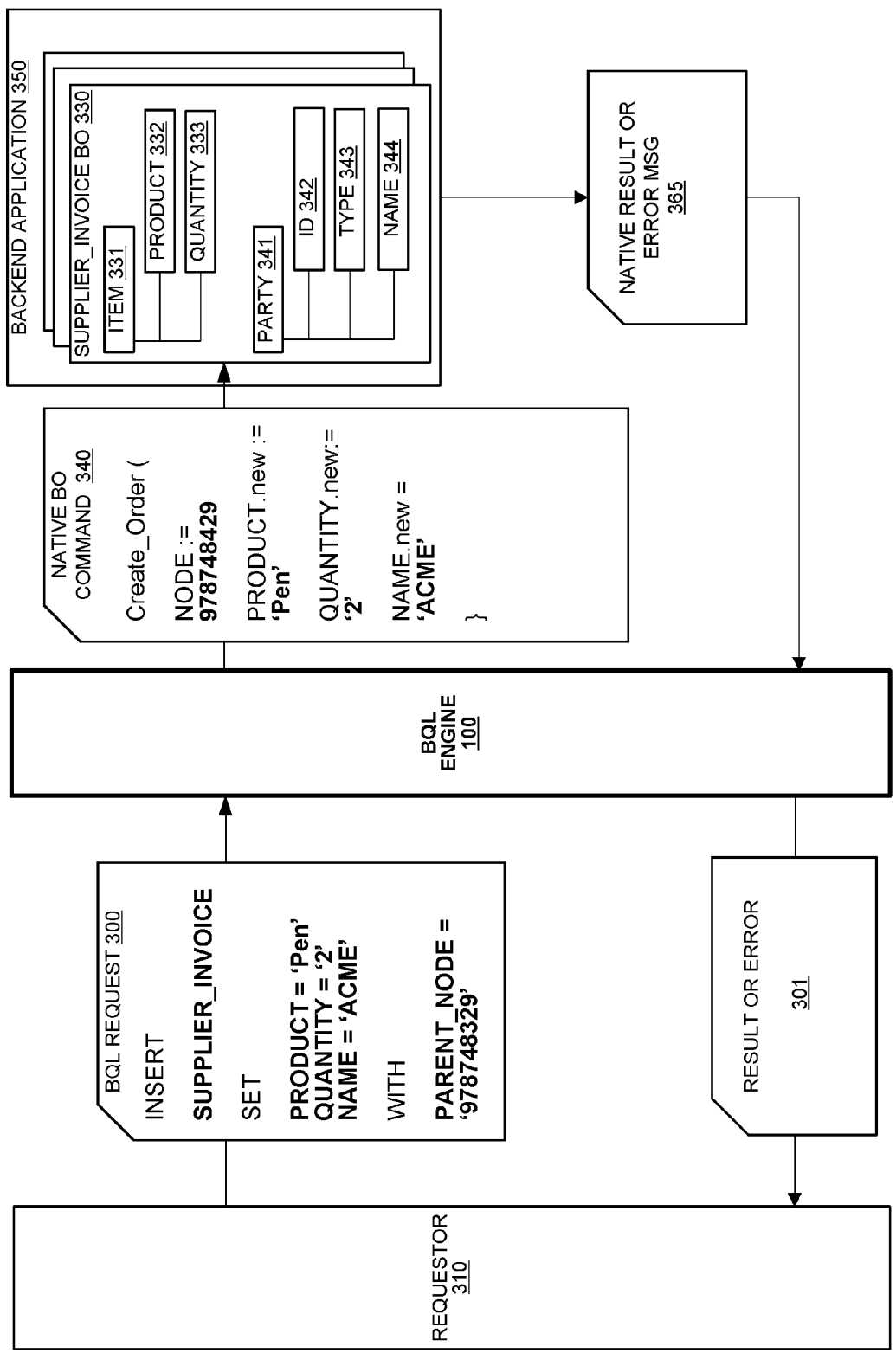
FIG. 3 shows a specific, non-limiting example of data flow, queries and results according to an embodiment of the invention.

As a specific non-limiting example of the generation and processing of an update request, FIG. 3 shows a data flow diagram including exemplary queries and results according to an embodiment of the invention. The exemplary business system includes a backend application 350 that uses a business object to hold supplier invoices, Supplier_Invoice 330. The Supplier_Invoice business object has two nodes, Item 331 and Party 341. The Item node identifies various items in the invoice, and includes the two properties Product 332 and Quantity 333, to specify a product ordered and a corresponding quantity. The Party node has three properties, ID 342, Type 343, and Name 344 to store information about the supplier associated with the invoice.

When a client application, service layer, or other requestor 310 wants to update information stored in a business object, it may construct a structured update query. Still referring to the specific non-limiting example of FIG. 3, the requester may want to update a supplier invoice by inserting a new product into an existing invoice.

The structured update query may use a predefined grammar including an INSERT clause that identifies target values (i.e., nodes and/or properties), a SET clause that specifies details about the update to be performed, and a WITH clause that identifies a related item in the backend. In the example, a new entry is added to a Supplier_invoice business object for two "Pen" products from the "ACME" Party. The requestor may wish the update to be associated with a specific parent node; in the example, it is associated with a parent node having an identifier of "978748329." The structured update request 300 may be received by a BQL engine 100, which parses the structured update query. As previously described, The BQL engine may parse the structured update query into native commands that can be processed by the target business object (Supplier_Invoice). For example, the BQL engine 100 may construct the native command 340 that conforms to the format and structure of commands expected by the Supplier_Invoice business object 330. It will be understood that the native queries 340 is provided as a non-limiting example, and that different applications, business objects, and/or nodes may utilize various different structures and formats for native queries.

When the native update command 340 is received by the backend application 350, an appropriate service (such as a "Create_Order" service) may be executed. In this example, the service extracts information from the nodes and properties identified in the native update command 340. The extracted information typically is returned in a format native to the service, such as the native results 365. Since the backend application, business object, and related services are only aware of the native command 340 (and not the structured update request 300), various types and formats of results and/or error messages may be generated. The native format may use a flat file, data stream, or other data transfer format with a specific structure. The native results 365 may be returned to the BQL engine as the requesting entity. The BQL engine may transform the native results 365 into a format expected by the requester, and return an appropriate result or error 301. For example, the results may be placed in a table conforming to the format of the BQL update request 300. Notably, when structured update requests are sent to a BQL engine, the structured update request may include multiple operations to be performed by the backend, including operations to be performed by multiple backend entities. A single structured update request also may generate multiple native commands. That is, a client application generate a single BQL update request instead of multiple native-format commands. This may be particularly useful in environments where round-trip communications are costly, such as in distributed environments with high latency. It may also reduce complexity in operations used by the client application, and improve performance by moving complex query structures from the client to the backend infrastructure.

It will be understood that the system and communication shown in FIG. 3 are exemplary only, and embodiments of the present invention may include additional layers, systems, and/or communication. For example, the BQL engine 100 may not interface with the backend applications directly, but instead may call an intermediate layer. Similarly, results 301 may be transmitted to a service layer before being sent to the requestor 310. If a search infrastructure is present, it may be integrated with the BQL engine or may be a separate entity.

Figure 4A:
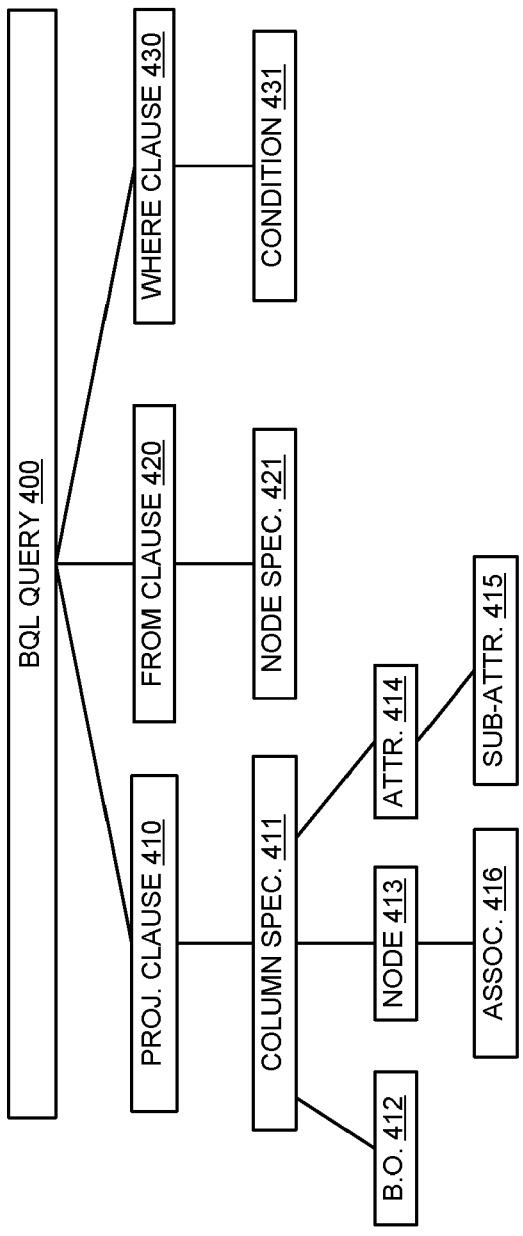
FIG. 4A shows an exemplary structure for a structured query according to the present invention.

FIG. 4A shows an exemplary structure for a general structured query according to the present invention. A BQL query 400 may include a projection clause 410, a from clause 420, and a where clause 430. The projection clause may specify the structure of a result set by listing elements and attributes that should be part of the result set. From the projection clause the type of the result structure can be derived, including whether the results should be presented as flat or structured results. The projection clause may define the set of columns that are visible in the result set. Wildcard operators, such as the * operator used in database SQL, may be used.

The projection clause may include a column specification 411 to identify the part of a business object that should be included in a result, including a business object node or attribute. The column specification may include an identification of the appropriate business object 413 and an identification 412 of the node or part of the business object to be included in the result. The column specification also may identify the node 413 to which the query is directed, as well as any associations 416 desired in the query. Attributes 414 and sub-attributes 415 of the column may be specified. Aliases may be specified for the headings of the result set.

The from clause 420 may specify a business object node from which data is selected by including a name or other identifier 421 of the appropriate node.

The where clause 430 may restrict tuples returned in the result set by specifying one or more conditions that must be met by result tuples. For example, boolean expressions may be included, in which case only the data sets matching the boolean expressions will be included in the result set. As a specific example, if the where clause is "WHERE ID<20," then only data sets having an attribute ID with a value less than 20 are returned.

Figure 4B:
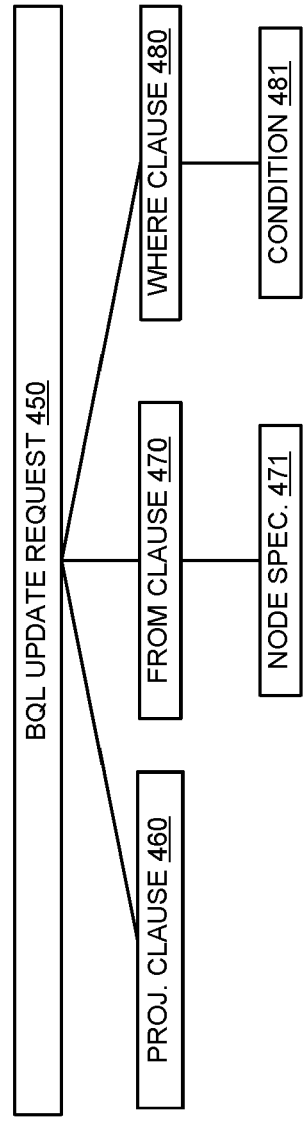
FIG. 4B shows an exemplary structure for a structured update request according to the present invention.

FIG. 4B shows a general BQL update request 450. The update request may include a projection clause 460 that specifies the type of action being performed, such as update, insert, or delete. A from clause 470 may specify a business object node on which the update request operations are to be performed, by including a name or other identifier 471 of the appropriate node. A where clause 480 may be included restrict stored data affected by the update request by specifying one or more conditions. For example, boolean expressions operating on data stored in the identified business object nodes may be used. As a specific example, a BQL update request to delete records in an employee database having an attribute "ID" with a value above 2000 may be "DELETE FROM BigCorp.Employees WHERE ID>2000." Other operations may be performed, and the from and where clauses may specify multiple business object nodes and/or conditions.

In an embodiment, the BQL engine may be configured to perform query responses using search indices and other structures. For example, FIG. 5 shows a business system in which the BQL engine 100 includes a fast search infrastructure (FSI) 103 and a local client proxy (LCP). The FSI may be used to access an index server 500 to determine if an indexed view exists for the data requested by a structured query. In an embodiment, the index server may reside on a separate physical and/or logical system from the rest of the BQL engine. If an indexed view exists the BQL engine may use the view to provide results in response to a structured query. Other enhancements typically used for standard relational databases can also be used. When a BQL engine receives a structured query, it may first query the FSI engine to determine if an FSI view corresponding to the request (i.e., an indexed view of the requested data) exists. If so, the BQL engine may make a single call to the FSI engine to retrieve the desired data. For example, the structured query received by the BQL engine may be passed directly to the FSI engine. If no FSI view exists, the BQL engine may call the LCP. The LCP may translate the structured query into a native format, or it may receive the native format query from the translation engine 105. The LCP may then coordinate requests between the BQL engine, the service layer 160, and/or the various applications, business objects, and nodes referenced by the translated query.

When the BQL engine receives an update request, it typically will interface directly with the LCP 104. In general, the LCP may include a programming interface that presents a consistent way of accessing business objects in a backend application. To translate a command from a structured update request into a format expected by the LCP and/or the backend applications, the BQL engine may first create an internal, virtual table. This virtual table may list entities involved in processing and executing the native commands. For example, each row of the table may include a business object identifier, a business object node identifier, a temporary ID, and an assignment command (such as assigning a value to an attribute of the business object node):

| | Virtual Table | | | |
|---|---|---|---|---|
| Row | Business Object | BO Node | temp ID | Assignment |
| 1 | AIRLINE | FLIGHT | 0938287 | CUSTOMER = 'Smith' |
| 2 | AIRLINE | FLIGHT | 0938288 | CLASS = 'Y' |
| 3 | AIRLINE | FARE | 0938291 | CONFIRM = '02848' |

Other columns may be included. For example, each row may include an indication of the type of operation (insert, update, delete) associated with the data in the row. Although only a single business object is shown for clarity, a virtual table may include multiple business objects, nodes, and/or assignments, depending on the operations to be performed in the backend applications.

Once the virtual table is created, the BQL engine may step through each row in the table and create a command in the appropriate native format (i.e., a format expected by the LCP and/or the appropriate backend application). In the example virtual table shown above, three native-format commands are created. Each column in the virtual table may correspond to a parameter expected by the LCP when executing native commands. Identifiers, such as "temp ID" above, may be used to refer to the table row and/or the related LCP commands, such as where a later command makes reference to the results generated by an earlier command. A native command template may be used to create the native commands. For example, a native command template may include fields to identify the business object, node, and attribute/value assignment for a command. As the BQL engine steps through the virtual table, each entry in the row being processed may be inserted into the appropriate field of the command template to generate the command defined by the row.

After one or more operations are successfully performed by the backend applications, the BQL engine may instruct the index server 500 and/or the FSI 103 to update search indices appropriately. For example, if an update request adds entries to a backend application, the FSI and/or index server may update search indices and/or indexed views of the appropriate data to include the new entries. Similarly, if an update request modifies or deletes data, any appropriate indexed views may be updated to reflect the modifications or deletions. Thus, the indexed views may be kept up-to-date with changes made to data stored in and accessed by the backend applications.

Figure 6:
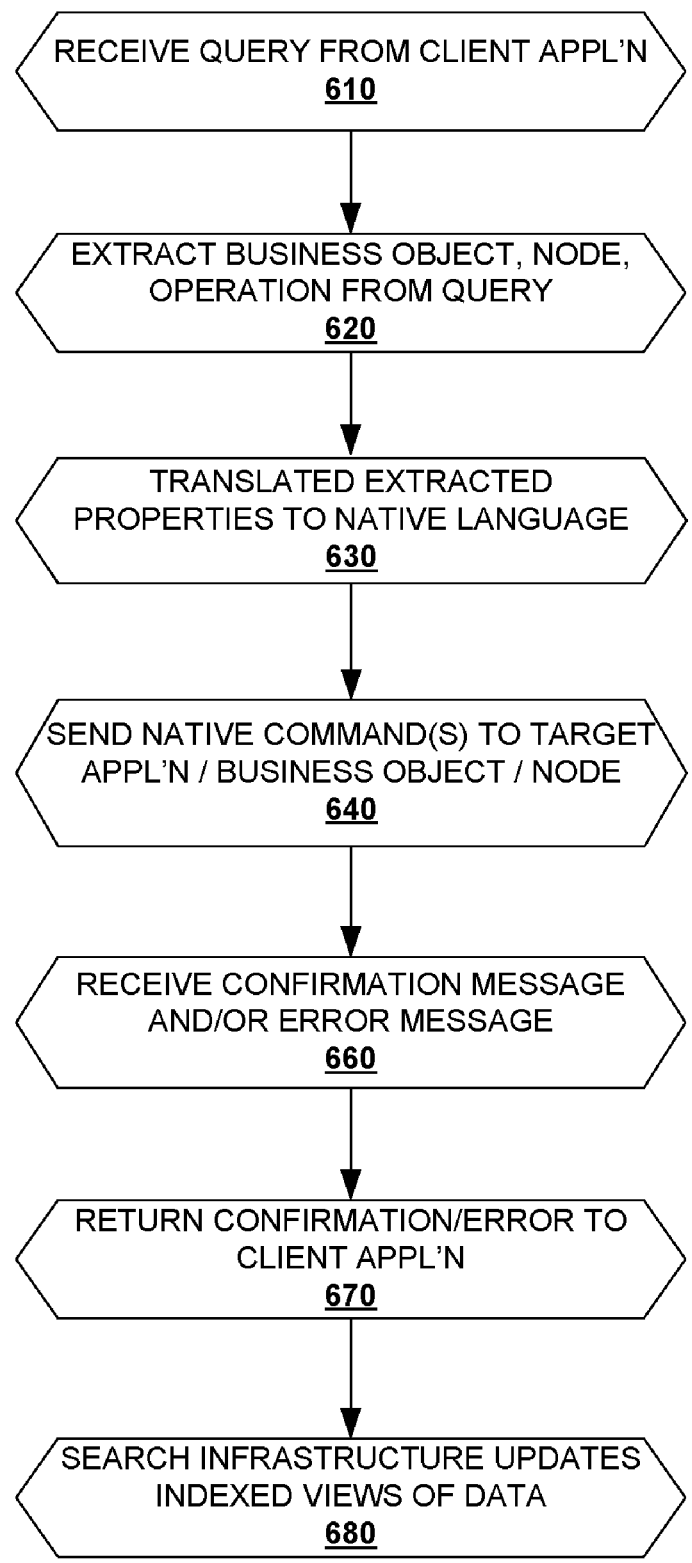
FIG. 6 shows an exemplary process used by a structured query engine according to an embodiment of the present invention.

FIG. 6 shows an exemplary process used by a structured query engine to process an update request. A structured update request may be received 610 from a client application or other requestor. The query engine may extract 620 information from the request, such as a target business object, a target node within the target business object, and an operation to be performed on the business object and/or node. Other information may be extracted, such as a restriction of which data is to be operated on. The query engine may translate 630 the structured query into one or more native commands, by using the extracted information to construct a native query. Typically, the native command is constructed in the format expected by the target business object and/or node. For example, the native command may be constructed by creating a template with the appropriate structure having empty fields, and inserting the extracted information into the empty fields. The native command may be sent 640 to the target backend application, business object, and/or node for processing. The engine may receive confirmation and/or error messages from the backend applications 660, which may be sent to the client application 670. The query engine also instruct a search infrastructure to update indexed views that depend on or are related to data affected by execution of the native commands 680.

Exemplary structured queries used to retrieve information from a backend system are presented below. The examples make use of two exemplary business objects, SupplierInvoice and Product, with the structures shown below:

| Bus. Obj. Name | Node Name | Element Name |
|---|---|---|
| SupplierInvoice | Header | ID |
| | | ChangeData |
| | | Date |
| | | Amount |
| | | Currency |
| | Item | ParentID |
| | | ID |
| | | Product |
| | | Quantity |
| | Party | ParentID |
| | | ID |
| | | PartyType |
| | | Name |
| | SellerParty | |
| | BuyerParty | |
| Product | Header | ID |
| | | Description |

For demonstration purposes, the following exemplary data set will be used. Each table shows the data for one business object node:

| SupplierInvoice Header | | | | | | |
|---|---|---|---|---|---|---|
| | | | | ChangeData | | |
| ID | CreationDate | LastChangedDate | User | Date | Amount | Currency |
| 1 | 10.05.2006 | 19.11.2006 | WUGGI | 05.05.2006 | 100,00 | EUR |
| 2 | 25.06.2006 | 25.05.2006 | HUGO | 26.06.2006 | 5,99 | USD |

| SupplierInvoice Item | | | |
|---|---|---|---|
| ParentID | ID | Product | Quantity |
| 1 | 1 | Ref to 2 | 2 |
| 1 | 2 | Ref to 1 | 10 |
| 2 | 3 | Ref to 3 | 1 |

| SupplierInvoice Party | | | |
|---|---|---|---|
| ParentID | ID | PartyType | Name |
| 1 | 1 | 1 | EXAMPLE Inc. |
| 1 | 2 | 2 | IO Ltd. |
| 2 | 3 | 2 | ACME Crop. |
| 2 | 4 | 1 | Test AG |

| Product Header | |
|---|---|
| ID | Description |
| 1 | Pen |
| 2 | Pencil |
| 3 | Eraser |

A structured query may be used to select all Header nodes of the Supplier Invoice business object. For example, the following query may be used:

SELECT siv~ID AS id FROM SupplierInvoice.Header AS siv

The result set for such a query contains the IDs of all SupplierInvoice business objects. The type of the result structure may be derived from the projection part of the structured query (i.e., "siv.ID"). In this case, the result structure may contain one element with a simple type. Hence, the result can be represented as a single-column result table, specified by the alias 'id':

| id |
|---|
| 1 |
| 2 |

More complex structured queries may be used, such as queries that include an implicit join of multiple elements. For example, the query SELECT siv.Party~Name AS name FROM SupplierInvoice.Header AS siv provides the Name attribute of the Party node. When the query is translated to a native query format, queries sufficient to extract the relevant data from multiple nodes may be constructed. First, instances of the Supplier Invoice Root node may be selected. For these Root node instances, all Party node instances may be retrieved. The result structure includes the Name attribute of the Party node, which has a simple data type and thus can be represented as a single-column table with one column. The alias for the selected attribute provides the column name for the result table:

| name |
|---|
| EXAMPLE Inc. |
| IO Ltd. |
| ACME Crop. |
| Test AG |

A similar structured query may include a further restriction in the WHERE clause:

SELECT siv.Party~Name AS name
FROM SupplierInvoice~Header AS siv
WHERE siv.Header~ID = 1

In this case, only Supplier Invoice Header nodes are selected which have the ID 1:

| name |
|---|
| EXAMPLE Inc. |
| IO Ltd. |

A system according to the present invention may also return query results in a structured format. Structured results may be suitable for services that allow for structured data, such as a Web Service based query service. In an embodiment, XML or a similar representation format may be used for structured results. For example, the following query may select Supplier Invoice Header nodes and the Item nodes associated with each:

SELECT siv, siv.Item TRANSPORTING (ProductID, Quantity)
FROM SupplierInvoice.Header AS siv In this query, all attibutes of the Header node may be transported. The attributes ProductID and Quantity are returned for the implicitly-joined Item nodes. In XML notation, the results of this query using the above sample data set may be returned as:

```
<BQLresultSet>
  <siv>
    <ID>1</ID>
    <ChangeData>
      <CreationDate>10.05.2006</CreationDate>
      <LastChangedDate>19.11.2006</ LastChangedDate >
      <User>WUGGI</User>
    </ChangeData>
    <Date>05.05.2006</Date>
    <Amount>100,00</Amount>
    <Currency>EUR</Currency>
    <siv.Item>
      <ProductID>2</ProductID>
      <Quantity>2</Quantity>
      <ProductID>1</ProductID>
      <Quantity>10</Quantity>
    </siv.Item>
  </siv>
  <siv>
    <ID>2</ID>
    <ChangeData>
      <CreationDate>25.06.2006</CreationDate>
      <LastChangedDate>25.05.2006</LastChangedDate>
      <User>HUGO</User>
    </ChangeData>
    <Date>26.06.2006</Date>
    <Amount>5,99</Amount>
    <Currency>USD</Currency>
    <siv.Item>
      <ProductID>3</ProductID>
      <Quantity>1</Quantity>
    </siv.Item>
  </siv>
</BQLresultSet>
```

As another example, the following query demonstrates the use of an alias in a structured result:

SELECT siv AS MySIV TRANSPORTING (ID)
FROM SupplierInvoice.Header AS siv

The alias name "MySIV" in the projection provides the name for the element in the structured result set:

```
<BQLresultSet>
    <MySIV>
        <ID>1</ID>
    </MySIV>
    <MySIV>
        <ID>2</ID>
    </MySIV>
</BQLresultSet>
```

An update request may be structured in a similar fashion. Typically, the most direct way to manipulate data is to change a row of a business object node using a unique NodeID. The NodeID may be predetermined, or it may be the result of a previous request. A business object node row also may be identified by entries other than the unique NodeID, such as where multiple rows are to be affected. As previously described, Boolean expressions also may be used. For example, the following requests may be used to modify existing business objects:

```
UPDATE SupplierInvoice.Item SET Quantity = '100' WHERE NodeID = '0A156027290E4582'
UPDATE SupplierInvoice.Item SET Quantity = Quantity + 1 WHERE NodeID = '0A156027290E4582'
UPDATE SupplierInvoice.Item SET Product = '4711', Quantity = '100' WHERE NodeID = '0A156027290E4582'
UPDATE SupplierInvoice.Item SET Quantity = '100' WHERE Product = '4711' OR Product = '4800'
```

Update requests also may be used to delete rows of business object nodes. Rows may be identified using any of the techniques described herein. The following commands are exemplary DELETE commands:

```
DELETE SupplierInvoice.Item WHERE NodeID = '0A156027290E4582'
DELETE SupplierInvoice.Item WHERE Quantity = '0'
```

Similarly, new rows may be inserted into business object nodes. Typically, no reference is provided for the new row, although a parent or other related node may be specified:

```
INSERT SupplierInvoice.Root SET Product = '4711', Quantity = '100', Currency = 'EUR' WITH ParentNodeID = '9BC46027290E4582'
```

(where '9BC46027290E4582' denotes a NodeID of a previously-existing row in SupplierInvoice.Root). Multiple rows may be inserted at the same time, and a later-inserted row may reference a prior row by defining a "handle" for the earlier row:

```
INSERT SupplierInvoice.Root SET Date = '20070101', Currency = 'EUR' WITH Handle = '$tmp$1234567890'
INSERT SupplierInvoice.Root.Item SET Product = '4711', Quantity= '100', Currency = 'EUR' WITH ParentHandle = '$tmp$1234567890'
```

Typically, update requests for inserts, updates, and deletes take the following generalized forms:

```
INSERT <Object Identifier> SET <Set Clause> WITH <With Clause>
UPDATE <Object Identifier> SET <Set Clause> WHERE <Where Clause>
DELETE <Object Identifier> WHERE <Where Clause>
```

As previously described, an object identifier may be any expression that identifies a row in a business object node. It may identify a single row or a group of rows, and may include Boolean expressions to define the rows being manipulated. A set clause specifies data changes such as attribute/value assignments to perform on the identified rows. A with clause describes handles for recursive operation within a single transaction. It can include, for example, a handle ID, a parent handle, and/or a parent node ID. A where clause identifies a row of a business object node on which the operations are to be performed. As previously described, it may identify a single row or multiple rows, and may use Boolean expressions to define the relevant rows.

As previously described, a business object may have a multi-level hierarchy of nodes. In some cases, this hierarchy may be quite complex. Therefore, it may be useful to define "deep" operations that affect not only an initial business object node, but all nodes dependent on the initial node. For example, a generalized "deep delete" statement may be used to delete an initial node or nodes and all nodes dependent below the specified node(s):

DELETE DEEP <Object Identifier> WHERE <Where Clause>

As will be understood by one of skill in the art, similar deep structures and operations may be used for other update requests, such as insert and update statements.

In an embodiment, a BQL implementation may be embedded in various other programming structures, syntaxes, and/or languages. For example, BQL commands may be embedded in various programming languages, including C, C++, Java, C#, Net, and other languages. BQL commands may be included in a library in a language or programming environment, allowing for native access to BQL functionality.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A method for executing a data operation request in a business system, comprising:
   receiving, from a frontend application, a data operation request for an operation to be performed by at least one of a plurality of backend applications, the data operation request specifying a business object, a node in the business object, and a data operation to be performed on data related to the business object node, the data operation request defined in a structured query language as a first query;
   extracting identifiers corresponding to the business object, the node within the business object, and the specific data operation to be performed from the first query;
   translating for any one of the plurality of backend applications the extracted information into a native command, the native command defined in a format native to the identified business object and the identified node, wherein the identified business object indicates to which one of a plurality of backend applications the native command is to be sent, wherein the translating comprises:
      creating a virtual table, each row of the virtual table listing the business object, the business object node, and an assignment of a value to an attribute of the business object node; and
      for each row in the virtual table, mapping the entries in the row to parameters expected by a backend application;
   sending the native command to the identified backend application containing the business object;
   performing the data operation on the data related to the specified business object node contained in the at least one of the plurality of backend applications;
   receiving an indication from the identified backend application that processing of the command completed, wherein the indication is in a format native to the backend application;
   transforming the format of the received indication into a format expected by the frontend application; and
   presenting the transformed indication to the frontend application.

2. The method of claim 1, wherein mapping the entries in the row comprises assigning each entry to a field in a native command template.

3. The method of claim 1, further comprising updating an indexed view of data stored in the business object based on the results of executing the command.

4. The method of claim 3, wherein the indexed view is updated to remove data deleted when the native command is executed.

5. The method of claim 3, wherein the indexed view is updated to add data created when the native command is executed.

6. The method of claim 3, wherein the indexed view is updated to reflect changes to data caused by execution of the native command.

7. The method of claim 1, wherein the backend application is accessed via a client proxy.

8. The method of claim 7, wherein translating the extracted information into a native command comprises:
   for each row in the virtual table, creating a client proxy command using the entries listed in the row.

9. A computer system, comprising:
   an input device to receive a structured language query related to a data operation request;
   a processor configured to:
      extract identifiers corresponding to a business object, a business object node, and a data operation to be performed on data related to the business object node referenced by the structured language query; using the extracted identifiers to indicate a backend application that contains the business object and business object node from a plurality of backend applications;
      translate for the indicated backend application the extracted identifiers related to the business object, the business object node, and the data operation into a native command, the native command specifying the business object, the business object node, and the data operation to be performed in a language native to the backend application, wherein the translating comprises
      create a virtual table, each row of the virtual table listing the business object, the business object node, and an assignment of a value to an attribute of the business object node; and
      for each row in the virtual table, map the entries in the row to parameters expected by a backend application; and
   an output to send the native command to the backend application.

10. The computer system of claim 9, comprising a fast search infrastructure to index data stored in the backend application.

11. The computer system of claim 10, comprising a local client proxy to execute the native command.

12. The computer system of claim 9, wherein the input is in communication with a client application displayed in a portal user interface, the client application to create the structured update request.

13. A computer-readable storage medium storing instructions which, when executed by a processor, cause the processor to perform a method comprising:
   receiving a data operation request for an operation to be performed by at least one of a plurality of backend applications, the data operation request specifying a business object, a node in the business object, and a data operation to be performed on data related to the business object node, the data operation request defined in a structured query language as a first query;
   extracting identifiers corresponding to the business object, the node within the business object, and the specific data operation to be performed from the first query;
   translating for any one of the plurality of backend applications the extracted information into a native command, the native command defined in a format native to the identified business object and the identified node, wherein the identified business object indicates to which one of a plurality of backend applications the native command is to be sent, wherein the translating comprises:
      creating a virtual table, each row of the virtual table listing the business object, the business object node, and an assignment of a value to an attribute of the business object node; and
      for each row in the virtual table, mapping the entries in the row to parameters expected by a backend application;
   sending the native command to the identified backend application contained in the business object;

performing the data operation on the data related to the specified business object node in the at least one of the plurality of backend applications;

receiving an indication from the identified backend application that processing of the command completed, wherein the indication is in a format native to the backend application;

transforming the format of the received indication into a format expected by the frontend application; and presenting the transformed indication to the frontend application.

14. The computer-readable storage medium of claim 13, wherein mapping the entries in the row comprises assigning each entry to a field in a native command template.

15. The computer-readable storage medium of claim 13, further comprising updating an indexed view of data stored in the business object based on the results of executing the command.

16. The computer-readable storage medium of claim 15, wherein the indexed view is updated to remove data deleted when the native command is executed.

17. The computer-readable storage medium of claim 15, wherein the indexed view is updated to add data created when the native command is executed.

18. The computer-readable storage medium of claim 15, wherein the indexed view is updated to reflect changes to data caused by execution of the native command.

19. The computer-readable storage medium of claim 13, wherein the backend application is accessed via a client proxy.

20. The computer-readable storage medium of claim 19, wherein translating the extracted information into a native command comprises:

for each row in the virtual table, creating a client proxy command using the entries listed in the row.

21. The method of claim 1, wherein translating the extracted information into a native command comprises:

based on the identified data operation, generating multiple native commands for execution by the backend application to perform the identified data operation.

22. The computer-readable storage medium of claim 19, wherein translating the extracted information into a native command comprises:

generating multiple native commands for execution by the backend application to perform the identified data operation.

* * * * *